United States Patent Office 3,206,453
Patented Sept. 14, 1965

3,206,453
MONOAZO DYESTUFFS OF LOW WATER-SOLUBILITY
Ernest Merian, Bottmingen, Basel - Land, Switzerland, Bruno J. R. Nicolaus, Milan, Italy, and Otto Senn, Arlesheim, Basel-Land, and Walter Wehrli, Riehen, Basel, Switzerland, assignors to Sandoz Ltd., Basel, Switzerland
No Drawing. Filed June 12, 1963, Ser. No. 287,221
Claims priority, application Switzerland, Aug. 13, 1959, 76,919
6 Claims. (Cl. 260—163)

The present application is a continuation-in-part of co-pending application, Serial No. 48,831, filed Aug. 11, 1960, now U.S. Patent No. 3,134,766.

This invention relates to new monoazo dyestuffs which are of low water-solubility and which correspond to the general formula

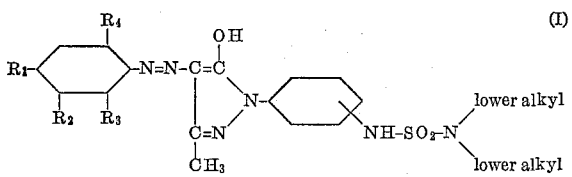   (I)

In this formula $R_1$ represents hydrogen, chlorine, bromine, fluorine, nitro, lower alkyl (e.g. methyl, ethyl or butyl), lower alkoxy (e.g. methoxy, ethoxy or propoxy), lower alkanoyl (e.g. acetyl or propionyl), lower alkanoyl-amino (e.g. acetylamino or propionylamino), lower carb-alkoxy (e.g. carbmethoxy, carbethoxy and carbpropoxy), the radical —NH—COO-lower alkyl (e.g.

—NH—COOCH₃

—NH—COOC₂H₅ or —NH—COOC₃H₇) or phenyl. $R_2$ represents hydrogen, chlorine, nitro, and lower alkyl and $R_3$ and $R_4$ each represent hydrogen, chlorine, bromine, nitro or methyl.

The radical

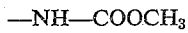

is connected to the nucleus in one of the positions 3' or 4'. "Lower" means that the radicals designated by this term contain 1 to 4 carbons, and particularly 1 to 2 carbon atoms. The dyestuff molecule contains no more than 2 nitro groups and no more than three halogen atoms but it may contain other substituents in addition to 1 or 2 nitro groups and to 1 to 3 halogen atoms.

The process for the production of the new dyestuffs comprises coupling a diazotized amine of the general formula

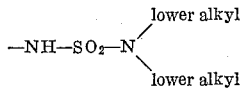   (II)

with a pyrazolone of the general formula

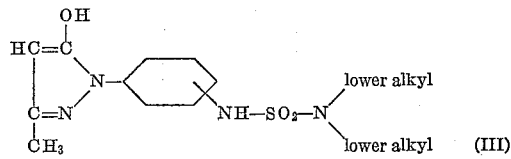   (III)

preferably at pH values above 7 and especially at 7–12, in the manner described in the examples.

The new monoazo dyestuffs of low water-solubility dye from aqueous dispersion synthetic polyamide fibers such as nylon and Perlon (registered trademark); cellulose ester fibers, e.g. secondary cellulose acetate and triacetate; polyvinyl fibers; acrylic and modified acrylic fibers, especially polyacrylonitrile fibers, polyester fibers, preferably terephthalic acid ester fibers such as Terylene, Dacron, Dacron 64, Kodel and Vycron (registered trademarks) in yellow or orange shades. The dyestuffs can also be applied to the same fibers by padding or printing techniques. They have good building-up properties on these fibers. The dyeings and prints possess very good fastness to light, gas fumes, washing, heat-setting, pleating, sublimation, perspiration, water and sea water, and are dischargeable. A fairly good reserve of viscose rayon, cotton, and wool is obtained, especially on after-treatment with a hydrosulfite. The new dyestuffs are also suitable for coloring lacquers, oils, plastics and artificial fibers in the mass. Cellulose acetate and triacetate dyed in the dope with these dyestuffs have high fastness to light, washing, perspiration, gas fumes, cross dyeing, alkaline bleaching, oxalic acid, dry cleaning and peroxide bleaching, and excellent fastness to water, sea water, soap baths, crocking, decatizing and pressing.

In the following examples the parts and percentages are by weight and the temperatures in degrees centigrade.

EXAMPLE 1

15 parts of 1-amino-4-acetylaminobenzene are diazotized in the normal maner with 7 parts of sodium nitrite. The solution of the diazo compound is run at 0° into a solution of 29.6 parts of 1-(4'-dimethylaminosulfonyl-amino)-phenyl-3-methyl-5-pyrazolone in 13.5 parts of 30% sodium hydroxide solution and 200 parts of water. A solution of 40 parts of crystallized sodium acetate is also added to neutralize the mineral acid reaction. The dyestuff so formed is separated and re-crystallized from ethanol. It melts at 218–219°. Yellow dyeings of excellent fastness are obtained with it on synthetic polyamide and polyester fibers.

In the following table further monoazo dyestuffs are recited which can be produced in an analogous manner as described in Example 1 and which are suitable for dyeing synthetic polyamide fibers and other artificial fibers. They correspond to the Formula I and are characterized by lower alkyl, the position of (lower alkyl)₂N—SO₂—NH—, $R_1$, $R_2$, $R_3$ and $R_4$ and by the shade of their dyeings on artificial fibers.

Table

| Example No. | Lower alkyl | Position of (lower alkyl)₂N—SO₂—NH— | $R_1$ | $R_2$ | $R_3$ | $R_4$ | Shade of dyeing on artificial fibers |
|---|---|---|---|---|---|---|---|
| 2 | CH₃ | 4' | Cl | H | H | H | Yellow. |
| 3 | CH₃ | 4' | Cl | Cl | H | H | Do. |
| 4 | CH₃ | 4' | Cl | H | Cl | Cl | Do. |
| 5 | CH₃ | 4' | H | Cl | H | Cl | Do. |
| 6 | CH₃ | 4' | NO₂ | H | H | H | Do. |
| 7 | CH₃ | 4' | NO₂ | H | H | Cl | Do. |
| 8 | CH₃ | 3' | NO₂ | H | H | NO₂ | Do. |
| 9 | C₂H₅ | 3' | NO₂ | H | Cl | Cl | Do. |
| 10 | C₂H₅ | 3' | NO₂ | Cl | H | Cl | Do. |
| 11 | CH₃ | 3' | Cl | H | H | NO₂ | Do. |

Table—Continued

| Example No. | Lower alkyl | Position of (lower alkyl)$_2$ N—SO$_2$—NH— | R$_1$ | R$_2$ | R$_3$ | R$_4$ | Shade of dyeing on artificial fibers |
|---|---|---|---|---|---|---|---|
| 12 | CH$_3$ | 4' | CH$_3$ | H | H | NO$_2$ | Yellow. |
| 13 | CH$_3$ | 4' | CO—CH$_3$ | H | H | H | Do. |
| 14 | CH$_3$ | 4' | CO—C$_2$H$_5$ | H | H | H | Do. |
| 15 | CH$_3$ | 4' | OCH$_3$ | H | H | H | Do. |
| 16 | CH$_3$ | 4' | OC$_2$H$_5$ | H | H | H | Do. |
| 17 | CH$_3$ | 4' | H | H | H | NO$_2$ | Do. |
| 18 | CH$_3$ | 3' | H | Cl | H | H | Do. |
| 19 | CH$_3$ | 3' | H | H | H | Cl | Do. |
| 20 | CH$_3$ | 4' | H | NO$_2$ | H | H | Do. |
| 21 | C$_2$H$_5$ | 4' | NH—OC—CH$_3$ | H | H | H | Do. |
| 22 | CH$_3$ | 4' | NH—OC—C$_2$H$_5$ | H | H | H | Do. |
| 23 | CH$_3$ | 4' | NH—COOC$_2$H$_5$ | H | H | H | Do. |
| 24 | CH$_3$ | 4' | NH—COOC$_3$H$_7$ | H | H | H | Do. |
| 25 | C$_2$H$_5$ | 4' | NH—COOCH$_3$ | H | H | H | Do. |
| 26 | C$_3$H$_7$ | 4' | Cl | H | H | H | Do. |
| 27 | C$_4$H$_9$ | 4' | Cl | H | H | H | Do. |
| 28 | CH$_3$ | 4' | COOCH$_3$ | H | H | H | Do. |
| 29 | CH$_3$ | 4' | COOC$_2$H$_5$ | H | H | H | Do. |
| 30 | CH$_3$ | 4' | COOC$_3$H$_7$ | H | H | H | Do. |
| 31 | CH$_3$ | 4' | C$_6$H$_5$ | H | H | H | Do. |
| 32 | CH$_3$ | 3' | H | CH$_3$ | H | CH$_3$ | Do. |
| 33 | CH$_3$ | 3' | CH$_3$ | H | CH$_3$ | H | Do. |
| 34 | CH$_3$ | 3' | CH$_3$ | H | CH$_3$ | CH$_3$ | Do. |
| 35 | CH$_3$ | 4' | H | H | CH$_3$ | CH$_3$ | Do. |
| 36 | CH$_3$ | 4' | Br | H | H | H | Do. |
| 37 | CH$_3$ | 3' | F | H | H | H | Do. |
| 38 | CH$_3$ | 4' | H | H | H | H | Do. |

We claim:
1. Dyestuff of the formula

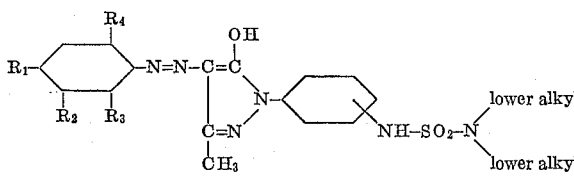

wherein
R$_1$ is a member selected from the group consisting of hydrogen, chlorine, bromine, fluorine, nitro, lower alkyl, lower alkoxy, lower alkanoyl, lower alkanoylamino, lower carbalkoxy and —NHCOO-lower alkyl,
R$_2$ is a member selected from the group consisting of hydrogen, chlorine, nitro and lower alkyl, and
R$_3$ and R$_4$ are, independently, a member selected from the group consisting of hydrogen, chlorine, nitro and methyl, said —NH—SO$_2$—N(lower alkyl)$_2$ moiety being in one of the positions 3' and 4', said dyestuff containing maximally two nitro groups and maximally three of said aforedefined halogen atoms.

2. Dyestuff of the formula

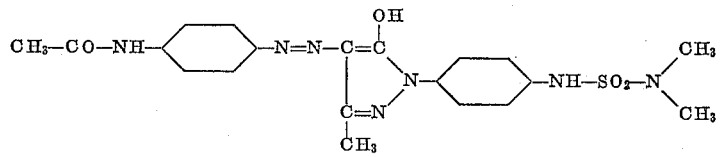

3. Dyestuff of the formula

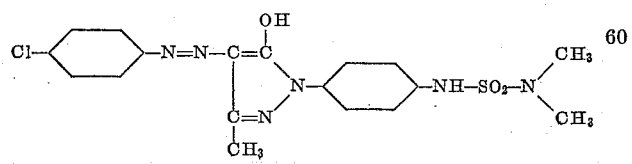

4. Dyestuff of the formula

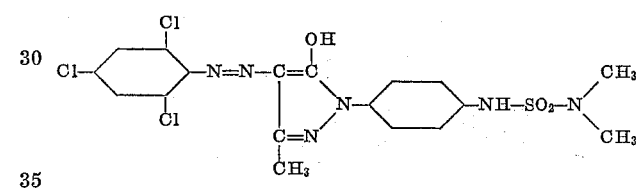

5. Dyestuff of the formula

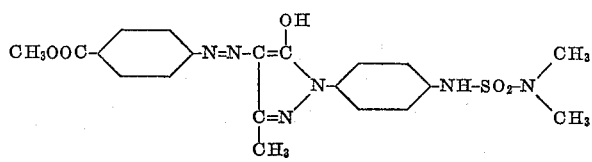

6. Dyestuff of the formula

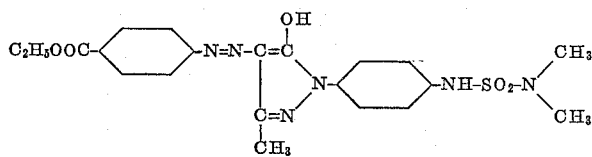

References Cited by the Examiner

UNITED STATES PATENTS 2,909,515  10/59  Ruckstuhl et al. _____ 260—163 X
3,012,843  12/61  Gangneux et al. _____ 260—163 X CHARLES B. PARKER, *Primary Examiner.*